Oct. 1, 1968 G. P. EBERLEN 3,403,449

METHOD OF ACCURATELY POSITIONING A HALFTONE SCREEN AND TEMPLATE THEREFOR

Filed Sept. 14, 1964 2 Sheets-Sheet 1

Inventor
George P. Eberlen
By: Olson, Trexler, Wolters & Bushnell
attys.

Inventor
George P. Eberlen
By: Olson, Trexler, Wolters & Bushnell
attys.

United States Patent Office 3,403,449

Patented Oct. 1, 1968

3,403,449

METHOD OF ACCURATELY POSITIONING A HALFTONE SCREEN AND TEMPLATE THEREFOR

George P. Eberlen, 513 Parkwood, Park Ridge, Ill. 60068

Filed Sept. 14, 1964, Ser. No. 396,309
5 Claims. (Cl. 33—184.5)

ABSTRACT OF THE DISCLOSURE

A template and method for providing a halftone screen with a plurality of accurate radial and angular positional references, comprising a circular sheet of flexible material including about the periphery thereof, closely adjacent the edge, a plurality of uniformly spaced holes, and at least one narrow, elongated, radially positioned slot therethrough. The holes are fitted over a group of corresponding mounting posts which are attached to a light table, and the halftone screen is placed over the template with a medial line of the former in alignment with the radially positioned slot of the latter.

This invention relates generally to the graphic arts and more particularly to the art of color printing.

In one specific aspect, the present invention relates to color printing by the letterpress and offset methods.

It is well known that color photographs, drawings, and the like can be printed in full color using white paper and only four colors of ink, black and the three primary colors, red, blue and yellow. However, to accomplish this, the image to be printed must be separated into the four corresponding color images. In addition, each color-separated image must be printed individually and, preferably, with a minimum amount of overlapping of the other colors. In order to obtain varying degrees of color depth and in order to promote minimum color overlapping, the individual color-separated images are further processed to reduce them to a rectilinear pattern of small dots, known as halftone image, and the dots are arranged at different angles for each image. The screens used in making the halftones have precisely ruled horizontal and vertical lines but have no angular indicia. Hence, in the past, whatever accuracy was achieved in registering the dots in proper angular relationship was the result of the skill of the individual operator. Errors often developed which resulted in highly unusual and definitely undesirable visual effects in the final printed product. Each time that this has occurred, it has been necessary to scrap at least one of the several etched printing plates, producing thereby a substantial economic loss.

Therefore, an important object of the present invention is to provide a new and improved method of positioning a halftone screen.

Another object of the invention is to provide a method of positioning a halftone screen in a plurality of precise angular positions.

Still another object of the invention is to provide a novel template for use in quickly and accurately positioning a halftone screen.

A further object of the invention is to provide a template which substantially eliminates the need for other than operators of ordinary skill in producing screened, color-separated images for use in making printing plates.

A still further object of the invention is to provide a new and improved method of making a halftone screen.

These and other objects and features of the invention will become more apparent from a consideration of the following descriptions.

A template in accord with the invention comprises a tough, flexible sheet of opaque material having a plurality of accurately sized apertures disposed at accurate angular positions closely adjacent its edge. Indicia are provided on the sheet indicating the successive angular values of the accurately sized apertures, and means are provided on the sheet defining a narrow, elongated, radially positioned optically open region through the sheet. The optically open region is employed to view a ruled line from a halftone screen in registering such a line with the optically open region and therefore with the template, thus establishing an angularity datum for use in precisely marking the screen and providing locating holes therein.

In order that the principle of the invention may be readily understood, a single embodiment thereof, but to which the application is not to be restricted, is shown in the accompanying drawings wherein.

Figures 3, 4, 5, 6:
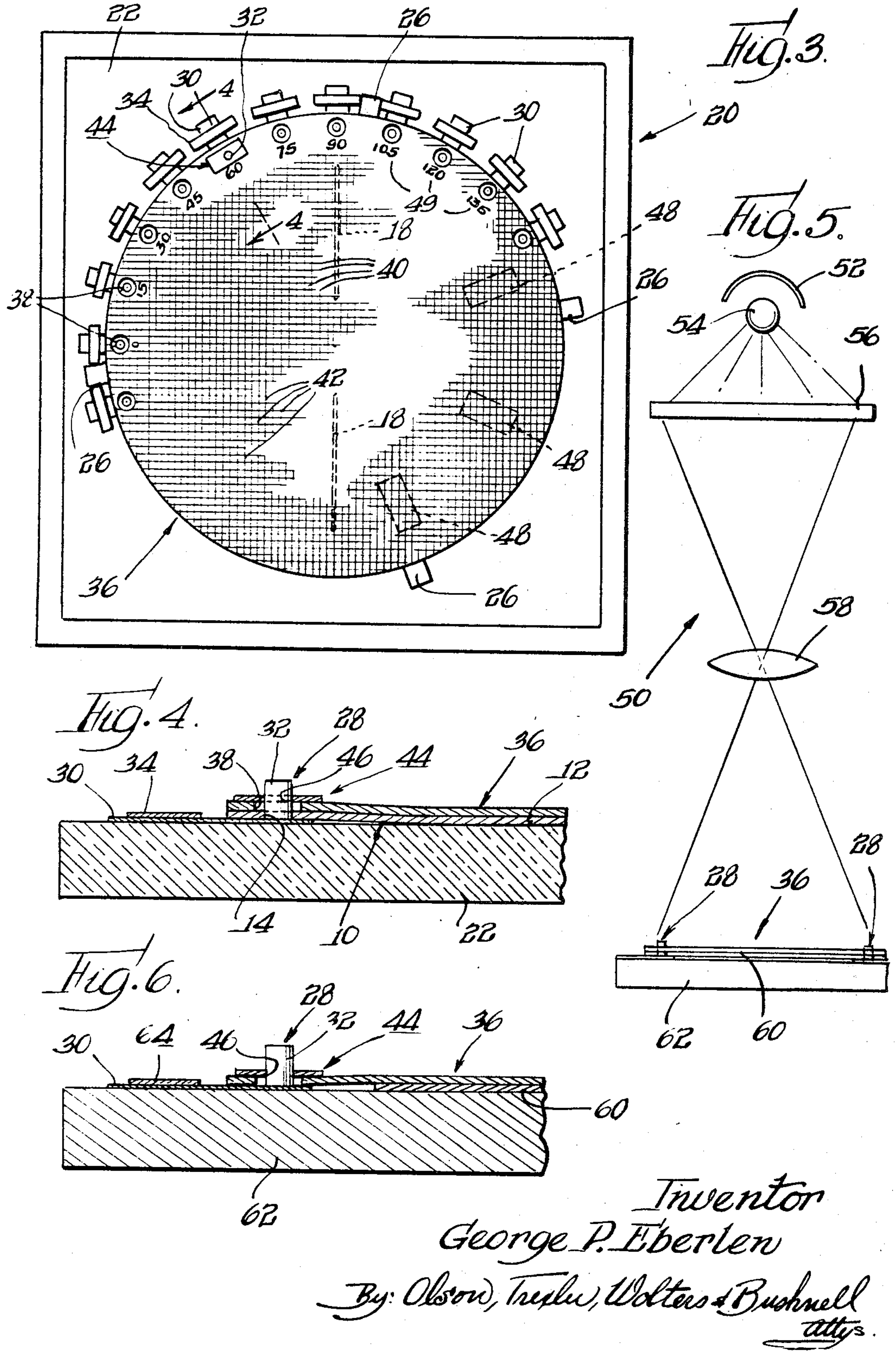
FIG. 3 is a top plan view of the light table of FIG. 2 with a halftone screen placed over the template, and illustrating the method of making a halftone screen in compliance with the invention.
FIG. 4 is an enlarged cross-sectional view taken substantially along the line 4—4 of FIG. 3.

FIG. 5 is a schematic diagram of a camera arrangement using a halftone screen fabricated and positioned in compliance with the present invention, the thickness of the screen and the several photographic films being exaggerated for purposes of illustration; and FIG. 6 is an enlarged cross-sectional view similar to the showing of FIG. 4 but illustrating the arrangement of the halftone screen and the photographic negative as found in the camera arrangement of FIG. 5.

Figures 1, 2:
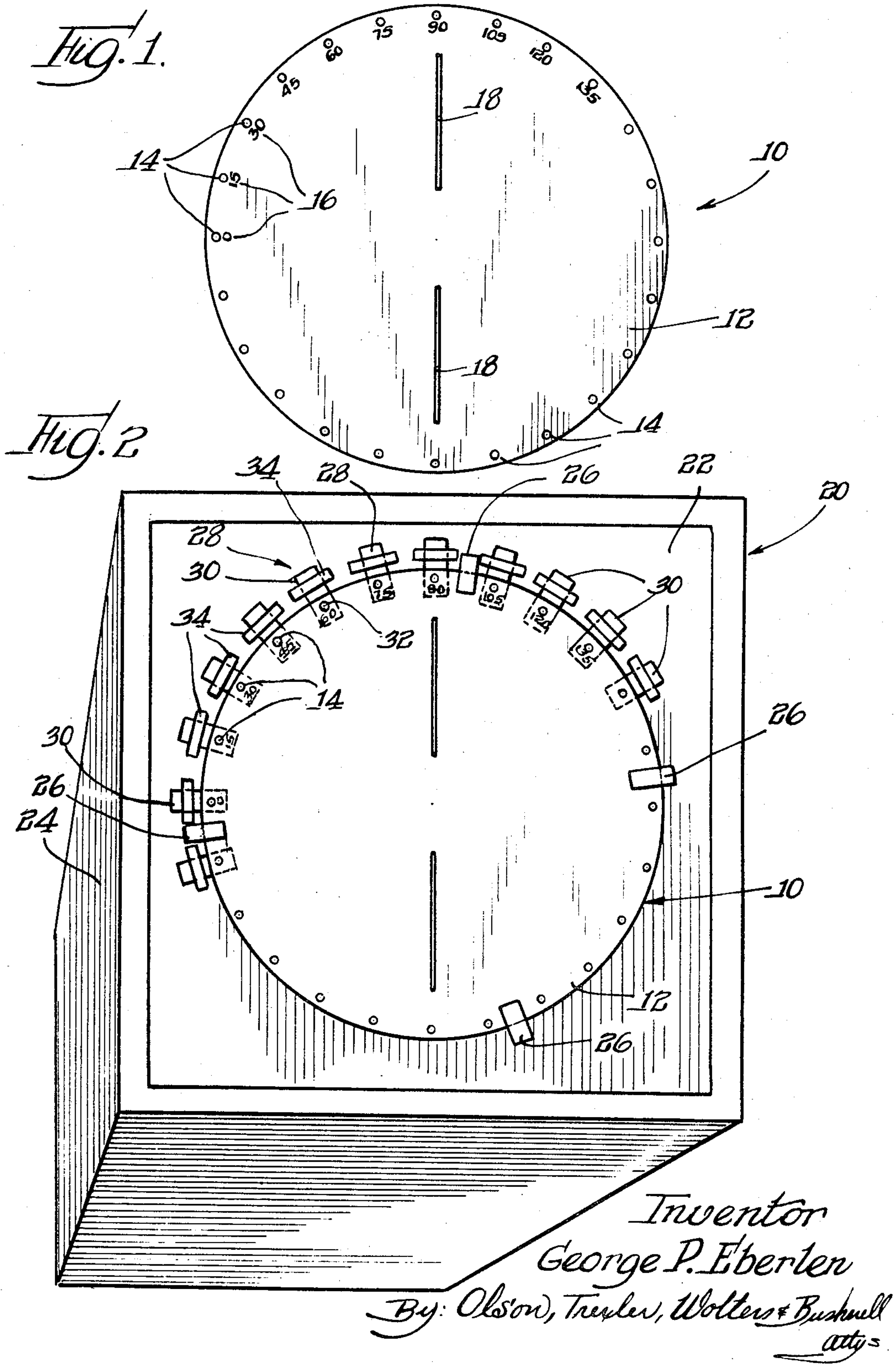
FIG. 1 is a plan view of a template constructed in compliance with the invention.
FIG. 2 is a high angle perspective view of a light table with the template of FIG. 1 mounted on the translucent panel in compliance with the procedures of the invention.

Referring now in detail to the drawings, specifically to FIG. 1, a template constructed in compliance with the principles of the invention will be seen indicated generally by the reference numeral 10. The template 10 comprises a tough, flexible sheet 12 having a number of circular apertures 14 perforated therein at angular positions closely adjacent its edge. In order to dispose the apertures 14 at the same radial distance from the center of the sheet 12 while at the same time situating all of the apertures 14 closely adjacent the edge of the sheet, the sheet is advantageously fashioned in circular form. The apertures 14 are, in addition, accurately sized and disposed in accurate positions both radially and angularly in order that they may define positional references. Well known die-cutting procedures may be employed in this accurate sizing and positioning of the apertures 14.

Because it is desirable to angulate a halftone screen at multiples of 15° for the various color images, the apertures 14 are correspondingly spaced at 15° increments; and a selected sector of the sheet 12 is provided with printed, numerical indicia 16 which set forth the successive angular values of successive apertures 14. Advantageously, the indicia 16 run from 0° to 135°. In addition to the apertures 14 and the indicia 16, the sheet 12 is fabricated with at least one, and preferably two diametrically arranged, narrow, elongated, radially positioned and optically open regions 18. The sheet 12 may be provided with the desired physical properties by fabricating it from a film base material, such as for example cellulose acetate film; and when the sheet 12 is fashioned from such a material, opacifying ingredients may be readily incorporated in the resin before the sheet is formed and the optically open regions may be provided by cutting narrow, elongated slots in the sheet. By making the sheet 12 of opaque material, the apertures 14 and the indicia 16 are more readily located from a visual standpoint. More importantly, registration of an optically open region 18 with a single ruled line of a halftone screen is greatly facilitated.

The template 10 is, in compliance with the invention, employed in providing a halftone screen with a plurality of peripherally disposed, precisely sized apertures located at accurate radial and angular locations. The first step in such use of the template involves laying the template flat on a work surface for facility in subseqent manipulation. As is shown in FIG. 2, the template 10 is advantageously deposited on a light table 20 which is provided with a translucent panel 22 for supporting the template and passing illumination thereto. In accordance with conventional practice, the light table 20 includes an opaque housing 24 for concentrating the light at the panel 22. When the template 10 has been smoothed out on the panel 22, the template is affixed to the panel using short sections of pressure sensitive adhesive tape 26, the tape 26 desirably having adhesive on only one face thereof.

Next, a suitable number of mounting elements 28 are assembled to the template 10 at the apertures 14 thereof. Turning for the moment to FIG. 4, a mounting element 28 is seen to comprise a thin, planar base member 30 and an upright, cylindrical post member 32, both fabricated from a suitably rigid material such as steel, the post member 32 being of accurate diameter for fittedly entering an aperture 14 in the template 10 with close tolerances therebetween. The post member 32 is spaced inwardly from the edges of the base member 30 adjacent one corner thereof and is securely fastened to the base member by suitable means such as spot welding. Mounting elements of the character of the mounting elements 28 are known in the trade as "Carlson pins."

Returning to FIG. 2, a mounting element 28 is desirably assembled to the template 10 at each of the angularly marked apertures 14, that is, at each of the apertures 14 indicated from 0° to 135°, and to the next adjacent unmarked apertures as is shown. The apertures 14 thus provide positional references for use in locating the mounting element 28. To hold the mounting elements 28 in place on the translucent panel 22, sections of pressure sensitive adhesive tape 34 are employed, tape 34 being similar to tape 26 in having adhesive on only one face thereof.

Once the template 10 has been secured to the light table and the mounting elements assembled therewith, a halftone screen 36 of conventional construction is placed over the template as is shown in FIG. 3, the screen 36 being cut first into a circle of approximately the same size as the template 10 and being perforated with oversize holes 38 to fit loosely over the post members 32 of the mounting elements. As is well known, halftone screens are commonly made of photographic film base material with the desired ruled lines being incorporated by photographic processes. The halftone screen 36 includes horizontal lines 40 and vertical lines 42 which are appropriately spaced to produce the desired optical aperture size. With the halftone screen 36 positioned over the template 10 so that a given, medial, vertical line 42 is disposed in approximate registration with the narrow, elongated, optically open regions 18 and so that the oversize holes 38 are situated in loosely fitting engagement with the post members 32, the position of screen 36 will be adjusted to bring the selected datum line 42 into precise registration with the narrow, optically open regions 18, the generous size of the holes 38 permitting this final adjustment in position. When a halftone screen that is smaller than the template 10 is to be employed, such a screen may be mounted in a window cut in a larger sheet of photographic base material.

After the halftone screen 36 is precisely registered with the template 10, accurately sized and shaped apertures are formed on the screen corresponding with the apertures 14 in the template and with the post members of the mounting elements 28. With reference to FIG. 4, a tab 44 which has been preliminarily perforated with an accurately sized hole 46 is positioned over the post member 32 in slidable superposition relative to the screen 36. Such a tab is provided at each of the mounting elements 28; and the holes 46, like the apertures 14, are cut with great precision as to size and roundness. In addition, the material for the tabs 44 is selected to be a strong material which will resist enlargement of the holes 46. Heavy gauge film base material may be usefully employed in this regard. Next, the tabs 44 are secured to the screen 36 by laying short sections of pressure sensitive adhesive tape over the tabs and in contact with the upper surface of the screen or by provision of a suitable adhesive material on the undersurface of each tab.

Because a reasonable amount of handling of the screen 36 is involved during the application of the tabs 44, it has proved advantageous to insure continuation of the registration of the screen and the template 10 by spot tacking the screen to the template using short sections of tape 48 having pressure sensitive adhesive on the opposite faces thereof. This spot tacking is indicated in FIG. 3.

After the tabs 44 have been positioned over the holes 38, preferably in conjunction with at least each of the angularly indicated apertures 14 in the template 10, angular indicia 49 will be marked on the screen 36 closely adjacent each of the tabs 44 using suitable means such as a conventional marking pen. Thus, the screen 36 is provided with a plurality of peripherally disposed, precisely sized apertures located at accurate radial and angular locations defining a series of positional references. Furthermore, the precisely sized apertures are provided with corresponding indications of their angular value. The screen 36 is now complete for use and may be separated from the template 10 by carefully peeling it from the temporary spot tack tape sections 48.

For purposes of affording a more complete understanding of the invention, it is advantageous now to provide a description of the mode in which the completed halftone screen 36 is used. As has been described hereinabove, color-separated images are reduced to halftone images in the production of etched plates for color printing, as by the letterpress method for example. FIG. 5 illustrates a camera arrangement, indicated generally by the numeral 50, of the type used in converting a color-separated image into a halftone image of the same subject matter. In the camera arrangement 50, a light source comprising a reflector 52 and an illuminating bulb 54 is focused to pass light through a color-separated photographic transparency 56 which carries the subject matter or image which is to be printed. The transparency 56 may be either a negative or a positive in accordance with the particular scheme for producing the printing plate. The light passing through the transparency 56 is collected by a lens 58 and transmitted to an unexposed photographic plate 60. The photographic plate 60 is supported on a camera back 62, and the halftone screen 36 is disposed in contact with the plate 60 generally between the plate 60 and the lens 58.

In compliance with the features of the invention, the screen 36 is positioned relative to the camera back 62 by means of mounting elements 28. Specifically and with reference to FIG. 6, the screen 36 is placed loosely on the camera back 62 generally in the desired position. Thereafter, a suitable number of the mounting elements, three usually being sufficient, are assembled with the halftone screen, the post members 32 of the mounting elements passing fittedly through the apertures 46 in the tabs 44 which have been affixed to the halftone screen. The apertures 46 define positional references for the loose mounting elements 28; and after the mounting elements have been assembled with the halftone screen, short sections of pressure sensitive tape 64 are employed in fastening the mounting elements to the camera back in substantially permanent locations. When three mounting elements 28 are employed, the central mounting element and, more particularly, its post member 32 may be employed as a screen angle indicator.

Assuming that the first color-separated image which is to be reduced to a halftone image is the yellow image, the aperture 46 corresponding with the 90° indicia will be placed on the screen angle indicator post member. If the subsequent color-separated image is the red image, the halftone screen 36 will be lifted from the now permanently affixed mounting elements and repositioned relative to the camera back so that the screen angle indicator mounting post fittedly enters the hole 46 which corresponds with the 75° indicia on the screen. For the blue image, the halftone screen will be cooperatively rotated so that the screen angle indicator post member enters the 105° hole. Appropriate halftone images will thereby be produced in a quick and easy manner and with assurance that the dots of the various halftone images will be in precisely the desired relative angularity. Each time that the halftone screen 36 is rotated to a different angular position, the secured mounting elements 28 will act as permanent positional references for locating the apertures 46 and therefore the entire halftone screen and its cross-hatched rulings.

The specific example herein shown and described is to be considered as being primarily illustrative. Various changes in structure and arrangement will, no doubt, occur to those skilled in the art; and such changes are to be understood as forming a part of this invention insofar as they fall within the spirit and scope of the appended claims.

The invention is claimed as follows:

1. A template for use with a light table and a plurality of mounting elements, each including a post member having a cylindrical shape and being of a predetermined diameter, in providing a halftone screen with a plurality of accurate radial and angular positional references, said template comprising: a circular sheet of tough, flexible material having a plurality of uniformly spaced holes about at least a portion of the periphery and closely adjacent the edge thereof adapted for receiving therein said post members, said holes in said sheet being circular in shape, each with a diameter large enough to receive one of said post members in a snug relation therewith, whereby said template is mountable on said light table, and at least one narrow, elongated radially positioned slot therethrough adapted for use in aligning therewith a medial line of said halftone screen upon the positioning of the latter over said template on said light table.

2. A template for use with a light table and a plurality of mounting elements, each including a post member, in providing a halftone screen with a plurality of accurate radial and angular positional references, said template comprising: a circular sheet of tough, flexible material having a plurality of holes located about the periphery and closely adjacent the edge thereof, said holes being spaced about said circular sheet at 15 degree intervals, and being adapted for receiving therein said post members, whereby said template is mountable on said light table, said sheet further including indicia indicating successive angular values of certain ones of said holes beginning with one arbitrary chosen one thereof, said indicia beginning with zero at said one arbitrary chosen hole and increasing to 135 degrees, and at least one, narrow, elongated, radially positioned slot therethrough extending in the direction of one of said holes indicated by said indicia, adapted for use in aligning therewith a medial line of said halftone screen upon the positioning of the latter over said template on said light table.

3. An arrangement for use in providing a halftone screen having a plurality of horizontal lines thereon, with a plurality of accurate radial and angular positional references, said arrangement comprising; a light table, a plurality of mounting elements, each including a post member of a predetermined size, and a template comprising: a circular sheet of tough, flexible material having at least one narrow, elongated, radially positioned slot therethrough, and, about at least a portion of the periphery and closely adjacent to the edge thereof, a plurality of uniformly spaced holes, each of said holes receiving one of said post members in a snug fitting relation therewith, said mounting elements being attached to said light table and said halftone screen being positioned over said template on said table so that a medial line thereof is in approximate registration with said narrow, elongated radially positioned slot in said template.

4. An arrangement as claimed in claim 3 wherein said plurality of holes are positioned at fifteen degree intervals about the entire periphery of said circular sheet, and wherein said sheet further includes indicia indicating the successive angular values of certain ones of said apertures beginning with one arbitrarily chosen one of said apertures.

5. An arrangement as claimed in claim 4 wherein said indicia begins at zero degree and extends successively from aperture to aperture in a clockwise direction to 135 degrees and wherein said elongated slot extends toward one of said successively spaced apertures in said sheet.

References Cited

UNITED STATES PATENTS

| | | | |
|---|---|---|---|
| 1,864,341 | 6/1932 | Davie | 33—75 |
| 2,434,566 | 1/1948 | Hulsmann | 33—75 X |
| 2,500,873 | 3/1950 | Sager | 33—174 |
| 2,637,110 | 5/1953 | Gilbertson | 33—174 X |
| 2,983,049 | 5/1961 | Andrisani | 33—184.5 |
| 3,040,644 | 6/1962 | Hearther | 96—45 X |

SAMUEL S. MATTHEWS, *Primary Examiner.*